United States Patent

Gerchow

[15] 3,673,656
[45] July 4, 1972

[54] PLUNGE FACING TOOL

[72] Inventor: Wilbur R. Gerchow, Ann Arbor, Mich.

[73] Assignee: Buhr Machine Tool Corporation

[22] Filed: Oct. 12, 1970

[21] Appl. No.: 80,218

Related U.S. Application Data

[63] Continuation of Ser. No. 723,518, April 23, 1968, abandoned.

[52] U.S. Cl. ........................................................29/105 A
[51] Int. Cl. ..........................................................B26d 1/12
[58] Field of Search......................................................29/105

[56] References Cited

UNITED STATES PATENTS

| | | | |
|---|---|---|---|
| 2,345,050 | 3/1944 | Jansen | 29/105 |
| 2,751,663 | 6/1956 | Levzinger | 29/105 |
| 2,348,089 | 5/1944 | Niekirk | 29/105 |
| 2,645,003 | 7/1953 | Thompson et al. | 29/105 |
| 2,664,617 | 1/1954 | Kralowetz | 29/105 |
| 3,191,449 | 6/1965 | Solski et al. | 29/105 |

*Primary Examiner*—Harrison L. Hinson
*Attorney*—Whittemore, Hulbert & Belknap

[57] ABSTRACT

The tool has a cutter holding head which may be rotatively engaged with or by a coaxial workpiece, the head removably and replaceably mounting on an axial face thereof a multiplicity of known type circular cutting inserts. These cutters are circumferentially spaced from one another about the axis of the tool, and they are also spaced or staggered slightly relative to one another in the radial sense, so that upon relative rotation of the tool and work in removing material from the latter, the cutters sweep shallow circular groove paths which radially overlap one another.

7 Claims, 3 Drawing Figures

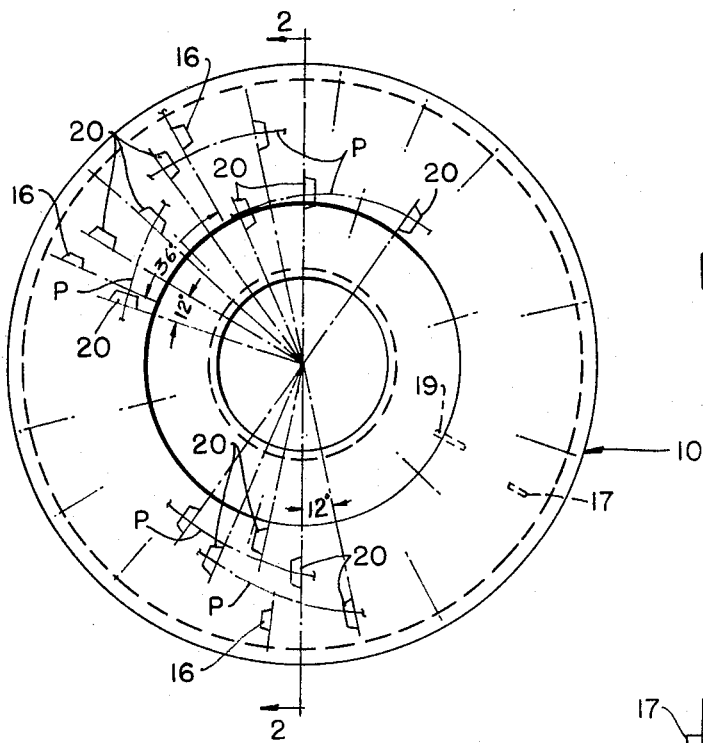
FIG.1
FIG.2
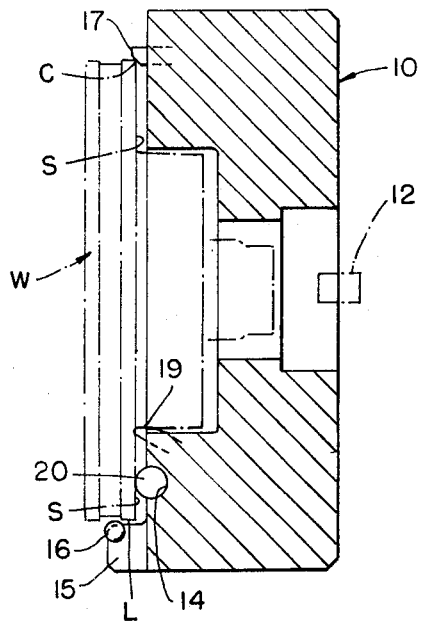
FIG.3
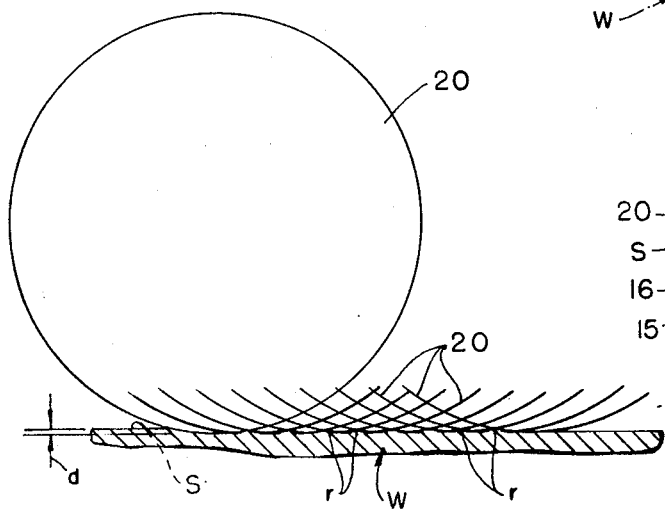
INVENTOR
WILBUR R. GERCHOW
BY *Whittemore, Hulbert & Belknap*
ATTORNEYS

PLUNGE FACING TOOL

This application is a continuation of application, Ser. No. 723,518 filed Apr. 23, 1968, now abandoned.

BACKGROUND OF THE INVENTION — FIELD

The improved tool of the invention has application in any face machining operation in which coaxial, relatively rotatable workpiece and tool holding members are engaged axially for an end facing operation of limited depth on the workpiece; and the tool presents important practical advantages in point of minimizing radial bearing and like loads, greatly increasing tool life and the like, as hereinafter described. More particularly, the tool is designed for an initial, rough-cutting operation on a casting, forging, stamping or the like. In most cases this will be followed by a finishing face cut; however, the desired degree of surface finish will control in this respect.

I am unaware of any prior art disclosures relating to cutters of any specific design, circular or otherwise, disposed in such a radially staggered or overlapped and circumferentially spaced relationship for the purpose of end facing workpieces.

SUMMARY OF THE INVENTION

The invention relates to an insert-bearing plunge facing tool which will usually be a rotating one, although as an obvious full equivalent it may be fixed and engaged by a rotating workpiece. The tool is appropriately driven axially by hydraulic or other suitable means constituting no part of the present invention. On the other hand, the tool may be axially fixed and the workpiece shifted against it in the plunge facing operation.

In accordance with the present invention, a head holding the cutters is a massive one which presents an axially facing tool mounting surface of considerable diameter; and this surface has means of a more or less conventional nature to releasably mount a multiplicity of replaceable hardened circular cutter inserts. They are of a known type, for example of molded and baked tungsten carbide, with the usual positive rake about their periphery.

The invention resides in the combination of a relatively large number, say 30, of inserts of this type with a mounting head, in a radial and circumferentially spaced relationship of the cutters to one another in which they as a group, in projecting equally in the axial direction from the mounting head, sweep the work in a similar number of radially overlapping face cutting swaths into an axially facing surface of the workpiece. The inserts are circumferentially spaced, preferably uniformly, from one another in relatively small angular increments, and are also radially spaced from one another, preferably in uniform increments also, at least insofar as the radial overlap of their individual cuts is concerned, which radial increments are of very slight extent, for example, 0.065 inch.

The result is that, upon a relative rotative sweep of the tool head and its cutting inserts in relation to the workpiece, the latter is faced to a desired axial depth to remove a major portion of the scale and external skin layer of the workpiece, and to present the latter in a very short interval of time for a succeeding finish operation.

BRIEF DESCRIPTION OF THE DRAWING

FIG. 1 is a schematic view in axial end elevation, as from the left of FIG. 2, indicating the intended placement of facing cutter inserts in a tool holder pursuant to the invention, this view also indicating a possible typical placement of certain auxiliary peripheral turning, chamfering and/or plunge relief cutters which may, if desired, be incorporated with the plunge face cutting insert arrangement of the invention;

FIG. 2 is a view in axial section through a tool assembly in accordance with FIG. 1, being along a line corresponding to line 2—2 of FIG. 1; and FIG. 3 is a diagrammatic view illustrating the operation of the multiple cutters of the improved tool as they operate in a rotative cutting cycle of the tool in which the cutters progressively increase the depth of the cut.

DESCRIPTION OF A PREFERRED EMBODIMENT

As best shown in FIG. 2, the tooling arrangement of the invention involves a number of cutters which are removably and replaceably mounted on a relatively massive rotary holder or head member, generally designated 10, which plunge faces a workpiece W. For the purpose of illustration, the latter may be considered to be a brake disc rotor having an annular shoulder surface S which is to be faced, and which may also call for peripheral turning, facing and/or internal relieving cuts. Tool head 10 may be rotatably and axially driven by means not germane to the invention, but preferably having a suitable connection to holder 10, as shown in dot-dash line in FIG. 2 and generally designated 12, which will permit removal of the holder from its driver for re-setting or replacement of its cutters. In the alternative, the head 10 may be stationary, and a workpiece W rotated and/or fed axially relative thereto. However produced, it is relative rotative drive and concurrent plunge to axial depth of the holder 10 and workpiece W which produces the facing operation contemplated by the improvement of the invention.

Tool holder 10 is, as illustrated in FIG. 2, provided with a multiplicity of seats 14, in which facing inserts 20 are removably received and clamped by conventional means, in a special arrangement pursuant to the invention which is later described in detail. Similarly, the holder 10 may incorporate axially extending front lugs 15 which releasably mount tungsten carbide inserts 16 for an external turning cut on workpiece W, quite aside from the essential objective of the invention, as at the peripheral land L.

Optionally, the head 10 may also mount in any suitable manner a number of external edge chamfering tools 17 to operate upon the workpiece coincident with its being faced. Likewise, it is contemplated that the head 10 may mount a number of internal relief cutters or groovers 19.

It is to be understood that the existence and arrangement of the outer diameter cutter inserts 16, the outer diameter chamfering cutters 17 and the inner diameter relief cutters 19 are entirely auxiliary, and to that extent secondary, to the present invention, which concerns itself mainly with the position of facing tool inserts 20, in an arrangement specifically shown in FIG. 1.

In the interest of schematically but completely illustrating and describing a typical plunge facing tool as secondarily equipped in the manner just described, the carbide outer diameter turning cutters 16 are, like inserts 20, preferably circular and peripherally raked positively, being removably and replaceably clamped fixedly in the holder lugs 15 by suitable known means; and there will typically be ten of these cutters equidistantly spaced and aligned circumferentially from one another. They are in a radial disposition relative to workpiece W to take a single O.D. cut axially across land L of the workpiece, upon relative rotation and axial approach of the latter and tool holder head 10.

In contrast, the chamfering cutter blades 17 are non-circular and may be five in number, in equal circumferential spacing and alignment, being appropriately mounted rigidly but removably on the body portion of holder 10. They inwardly chamfer a peripheral edge of workpiece W. Plunger relief or grooving blades 19 may typically be six in number, in equally spaced array; and they circularly relieve the brake disc rotor which constitutes the instanced workpiece W in a zone defining the inner periphery of the latter's faced surface S.

Referring specifically to FIG. 1, this illustrates a few of the carbide O.D. turning cutters 16 as being in equal circumferential spacing of 30° from one another, and at a common radial distance from the axis of holder 10. The relief blades 19 and chamfering blades 17 appear, only one apiece for clarity, in dotted line in FIG. 1.

In a typical set-up pursuant to the invention, there are a total of 30 of the plunge facing inserts 20, arranged at equal spacings of 12° from one another in the circumferential sense. The angles are marked by dot-dash lines radiating from the axial center of holder 10. Cutters 20 are preferably threefourths inch diameter, round tungsten carbide inserts having positive rake about their individual peripheries, as shown in FIG. 1.

Further pursuant to the invention, inserts 20 are spaced or staggered very slightly relative to one another in the radial sense, in increments of, say, 0.065 inch. This does not signify that inserts 20 which lie at successive 12° radii in the circumferential array are necessarily spaced radially from one another to the extent of 0.065 inch; it does signify that any insert 20 is spaced from all the others in a multiple (1 – 30) of that decimal.

The desired cutting effect is illustrated schematically in FIG. 3. That is, upon relative rotation and axial advance toward one another of holder head 10 and workpiece W, the full complement of cutters 20 will form multiple facing cuts, 30 in number, which slightly overlap one another in the radial sense. Typically, the full depth of the cuts made by the cutters into the brake disc face surface S, as indicated at $d$ in FIG. 3, is 0.0015 inch, with the result that the latter is left roughly face-turned, the cuts spaced by slight circular ridges $r$. The piece W is ready for a succeeding finish face cut by conventional means, assuming that a flatter or smoother surface is in order.

As indicated in FIG. 1, the circumferential progression of not necessarily circumferentially successive cutters may well be in a continuous spiral swath or path P, partial segments of which are shown in FIG. 1. However, the placement of cutters 20 may be more random in nature, so long as there is some slight radial overlap of the cuts made by all of the inserts 20.

As indicated above, the use of multiple circular plunge facing inserts has the effect of minimizing radial thrust load on spindle or like bearing means. This is because of the fact that in grooving into the workpiece the cutters 20 are radially supported to a considerable extent by the workpiece as metal is being removed. Manifestly, the cutters may be set on head 10 for either right hand or left hand relative rotation of the tool and the workpiece.

Tool life is also increased to as much as 15–20 times that of conventional cutter heads. That is, due to the use of multiple inserts 20 they are only locally subject to cutting wear. Furthermore, the inserts may be loosened, indexed about their axes and re-clamped onto head 10 as many as eight times before being discarded.

The preferred mounting of the holder head 10 for actuation by hydraulically operating draw bar or like means permits a quick change-over from one head to another while the former is being reset as to its tools 20 on the bench.

What is claimed is:

1. A plunge-acting tool adapted to face machine a given surface area and also to machine adjacent annular edge portions of a workpiece under relative rotation about a fixed common axis and axial thrust engagement of the tool and workpiece, one of which rotates and the other of which is rotatively fixed, comprising a holder having a set of substantially identical cutters projecting equidistantly therefrom in the direction of said fixed common axis of relative rotation for machining engagement with the workpiece, which cutters alone and of themselves face machine the entirety of said given area in a continuing phase of said relative rotation and thrust engagement, said cutters being spaced from one another at minor angular increments in the general direction of said relative rotation and in a 360° annular zone about said axis, and also being arranged in a succession in a direction at a substantial angle to that direction, said arrangement being such that at least some of the cuts made by the cutters in the workpiece overlap one another, at least one chamfering blade fixedly mounted on said holder in radially spaced relation to said face machining cutter set and in position to chamfer an edge of the workpiece radially adjacent said given area of the latter, and at least one turning cutter fixedly mounted on said holder in radially spaced relation to said face machining cutters and chamfering blades and in position to turn an annular surface of the workpiece adjacent said given area and chamfered edge of the latter, said sets operating in timed relation to one another in said continuing phase and under the force of the thrust engagement.

2. A plunge-acting tool adapted to face machine a given surface area and also to machine adjacent annular edge portions of a workpiece under relative rotation about a fixed common axis and axial thrust engagement of the tool and workpiece, one of which rotates and the other of which is rotatively fixed, comprising a holder having a set of substantially identical cutters projecting equidistantly with one another from the holder in the direction of said fixed common axis of relative rotation for machining engagement with a face of the workpiece, which cutters alone and of themselves face machine the entirety of said given area in a continuing phase of said relative rotation and thrust engagement, said cutters being spaced from one another radially of said axis and also being spaced in a generally circumferential direction from one another at minor angular increments in a 360° angular zone about said axis, the extent of the radial spacing being such that at least some of the cuts made by the cutters in the workpiece radially overlap one another, a set of circumferentially spaced chamfering blades fixedly mounted on said holder in radially spaced relation to said face machining cutter set and in position to chamfer an edge of the workpiece radially adjacent said given area of the latter, and a set of turning cutters fixedly mounted on said holder in radially spaced relation to said face machining cutter and chamfering blade sets and in position to turn an annular surface of the workpiece adjacent said given area and chamfered edge of the latter, said sets operating in timed relation to one another in said continuing phase and under the force of the thrust engagement.

3. The tool of claim 1, in which said cutters are of circular outline and are fixedly but removably mounted to said holder for adjustment about the respective axes thereof, said cutters making arcuately grooved, radially overlapping cuts in the workpiece.

4. The tool of claim 2, in which said cutters are of circular outline and are fixedly but removably mounted to said holder for adjustment about the respective axes thereof, said cutters making arcuately grooved, radially overlapping cuts in the workpiece.

5. The tool of claim 2, in which the circumferential spacing of the cutters is at equal angles about said axis.

6. The tool of claim 4, in which the circumferential spacing of the cutters is at equal angles about said axis.

7. The tool of claim 1, in which said spacing of said cutters from one another is at equal angular intervals.

* * * * *